United States Patent Office 2,826,526
Patented Mar. 11, 1958

2,826,526
ADHESIVES

Thomas James Meyrick, Edryd Gwylfa Parry, and John Thomas Watts, Blackley, Manchester, England, assignors to Imperial Chemical Industries Limited, a corporation of Great Britain No Drawing. Application September 10, 1954
Serial No. 455,346

Claims priority, application Great Britain November 10, 1948

8 Claims. (Cl. 154—139)

This invention relates to adhesives and to their use for bonding rubbers or other polymeric materials to themselves or to fibrous materials.

This application is a continuation-in-part of application Serial No. 123,310, filed October 24, 1949, now abandoned.

According to the invention we provide a process for bonding rubbers or other synthetic polymeric materials to themselves or to fibrous materials which comprises bringing the materials together in the presence of a compound of the formula $$R(NHCOCR'R''COR''')_n$$

wherein R is an $n$-valent, aliphatic, including cycloaliphatic, aromatic or aliphatic-aromatic hydrocarbon radical, saturated or unsaturated unsubstituted or substituted with a group or groups free from active hydrogen, R' and R'' are hydrogen, X, COX', or COOX'', the same or different, R''' is X'''' or OX'''', wherein X, X', X'', X''' and X'''' are monovalent aliphatic, including cycloaliphatic, aromatic or aliphatic-aromatic hydrocarbon radicals, saturated or unsaturated, substituted or unsubstituted, the same or different, and $n$ is an integer from 2 to 5.

Compounds of the stated formula can be prepared, for example, by interaction of compounds containing reactive methylene groups such as acetoacetic esters, ethyl α-acetobutyrate, acetylacetone, malonic esters and the like with polyisocyanates such as ethylene diisocyanates, butylene diisocyanate, hexamethylene diisocyanates, benzene di- and tri-isocyanates, toluene di- and tri-isocyanates, diphenylmethane p:p'-diisocyanates, dicyclohexylmethane diisocyanates, chlorobenzene di- and tri-isocyanates, naphthalene di- and tri-isocyanates, stilbene diisocyanate, ditolylmethane p:p'-diisocyanates, dixylylmethane diisocyanates, diphenylpropane p:p'-diisocyanates, diphenylmethane tetraisocyanate, trimethylbenzene triisocyanates, phenyltolylmethane triisocyanates, ditolylmethane triisocyanates, and triphenylmethane triisocyanates. Or they may be prepared by interaction of polyamines with ketones, diketones, substituted or unsubstituted acetoacetic esters and homologues thereof, substituted or unsubstituted malonic ester halides and the like.

Thus as examples of compounds of the stated formula there may be mentioned N:N'-bis-(acetoacetyl)-, N:N'-bis-(carbethoxyacetoacetyl)-, N:N'-bis - (α - (carbo - 2-chlorethoxy)acetoacetyl)-, N:N'-bis-(α:α-dicarbethoxyacetyl)-, N:N'-bis-(diacetoacetyl)-, N:N'-bis-(carbethoxyacetobutyryl)-, N:N'-bis-(α:α-dicarbethoxybutyryl)-, N:N'-bis-(carbethoxyacetyl), N:N' - bis - (carballyloxyacetoacetyl)-, N:N' - bis - (carbethoxybenzoylacetyl)-, N:N'-bis-(α-benzoylacetoacetyl)- and N:N'-bis-(benzyloxyacetoacetyl)- hexamethylene diamines or -cyclohexyl diamines, or diaminodicyclo-hexylmethanes or chlorophenylene diamines, or -toluylene diamines or diaminodiphenylmethanes and similar N:N':N''-tris(acetoacetyl)-, etc. -toluylene triamines or triaminotriphenylmethanes.

The following examples illustrate the preparation of the compounds as described above.

EXAMPLE 1

*N:N'-bis(α-carbethoxyacetoacetyl)-hexamethylenediamine*

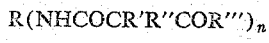

114.4 parts of ethyl acetoacetate are added over about 15 minutes to a stirred suspension of 0.4 part of sodium in small pieces in 200 parts of dry ether at 20–25° C. with exclusion of moisture and the mixture is stirred at this temperature until the sodium has completely reacted. 67.2 parts of hexamethylene 1:6-diisocyanate are added over about 1 hour while maintaining the temperature below 30° C. with cooling and thereafter the mixture is stirred at 15–25° C. for 18 hours. The white product which separates is filtered and may be further purified by dissolving in a suitable solvent, for example petroleum ether of boiling point 60–80° C., from which solvent it separates on cooling as a white crystalline solid of melting point 81–82° C.

EXAMPLE 2

*N:N'-bis(α-carbethoxyacetoacetyl)-toluylene-2:4-diamine*

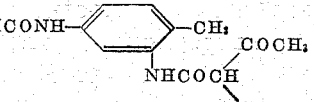

This is prepared as described in Example 1 using in place of hexamethylene-1:6-diisocyanate 69.6 parts of toluylene-2:4-diisocyanate. The reaction product is filtered and may be further purified by dissolving in hot benzene, the filtered solution depositing a white crystalline solid, M. P. 133–134° C.

EXAMPLE 3

*N:N'-bis-(α-carbethoxyacetoacetyl)-4:4'-diaminodiphenylmethane*

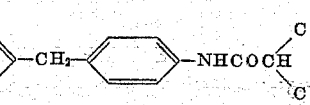

This is made as described in Example 1 using in place of hexamethylene-1:6-diisocyanate a solution of 100 parts of 4:4-diisocyanato-diphenylmethane in 200 parts of dry ether. The reaction product is filtered and may be further purified by dissolving in hot benzene, the filtered solution depositing a white crystalline solid, of melting point 134–135° C.

In place of the pure diisocyanate, a corresponding amount of technical diisocyanato-diphenylmethane may be used. The reaction product likewise isolated has a melting point of 104–110° C.

EXAMPLE 4

N:N'-bis-(α-carbethoxyacetoacetyl)-p-phenylenediamine

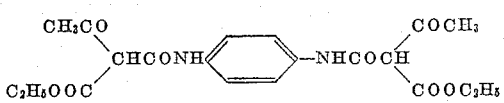

14.25 parts of ethyl acetoacetate are added over about 15 minutes to a stirred suspension of 0.05 part of sodium in small pieces in 30 parts of dry benzene at 20–25° C. with exclusion of moisture and the mixture is stirred at this temperature until the sodium has completely reacted. A solution of 8.0 parts of p-phenylenediisocyanate in 55 parts of dry benzene is added at 20–23° C. with cooling and the mixture thereafter stirred at this temperature for 20 hours. The reaction product is filtered and may be further purified by dissolving in hot dioxane, the filtered solution depositing a white crystalline solid melting at 166–167° C. with decomposition.

EXAMPLE 5

N:N'-bis-(α-carbethoxyacetoacetyl)-1-chloro-2:4-phenylenediamine

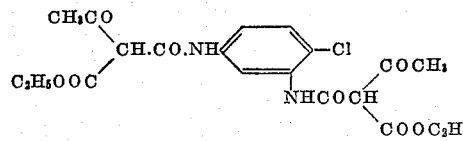

This was made as in Example 1 using in place of hexamethylene 1:6-diisocyanate a solution of 77.8 parts of 1-chlorophenylene-2:4-diisocyanate in 200 parts of dry ether and conducting the whole reaction at 18–20° C. The reaction product may be further purified by dissolving in hot petroleum ether of boiling point 60–80° C., the hot filtered solution depositing a white crystalline solid of M. P. 125–126° C.

EXAMPLE 6

N:N'-bis-(α-carbethoxyacetoacetyl)-4:4'-diaminodicyclohexylmethane

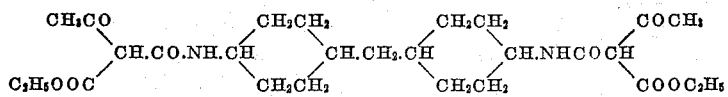

A mixture of 13 parts of ethyl acetoacetate, 25 parts of dry benzene and 0.01 part of sodium are stirred at 200° C. with exclusion of moisture until the sodium has completely reacted. A solution of 9.2 parts of 4:4'-diisocyanato-dicyclohexylmethane in 25 parts of dry benzene is added slowly while the temperature is maintained at 20–30° C. by external cooling, the mixture being thereafter stirred for 15 hours at 18–20° C. The benzene is distilled off under reduced pressure at a temperature below 60° C., and the residual oily solid purified by stirring with cold petroleum ether of boiling point 40–60° C. The undissolved solid reaction product was filtered and melted at 128–130° C.

EXAMPLE 7

N:N'-bis-(α-carbethoxyacetoacetyl)-1:5-naphthylenediamine

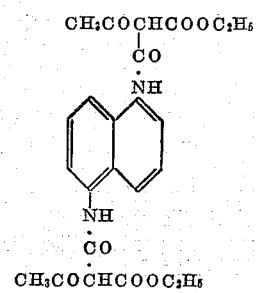

A mixture of 13.7 parts of ethyl acetoacetate, 25 parts of benzene and 0.1 part sodium in small pieces was stirred at 20–25° C. with exclusion of moisture until the sodium had completely reacted. While maintaining the temperature at 35–37° C., a hot solution of 10.5 parts naphthylene-1:5-diisocyanate in 170 parts dry benzene is added over ¾ hour and the mixture thereafter stirred at this temperature for 7 hours. The reaction product is filtered and may be further purified by extraction with boiling xylene or methylene dichloride, the hot extracts depositing a white crystalline solid melting at 198–200° C. with decomposition.

EXAMPLE 8

N:N':N''-tris-(α-carbethoxyacetoacetyl)-2:4:6-triaminotoluene

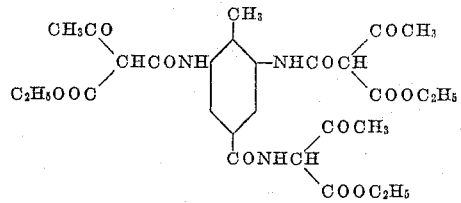

A mixture of 26 parts of acetoacetic ester, 50 parts of dry benzene and 0.01 part sodium are stirred with exclusion of moisture until the sodium has completely reacted. A solution of 10.75 parts of 2:4:6-triisocyanatotoluene in 50 parts dry benzene is added below 35° C. over 1½ hours and the mixture thereafter gently boiled for a further 1½ hours. The reaction product is filtered when cold and may be further purified by repeated crystallisation from benzene, to give a white crystalline solid melting at 152–153° C.

EXAMPLE 9

N:N':N''-tris-(α-carbethoxyacetoacetyl)-4:4':4''-triaminotriphenylmethane

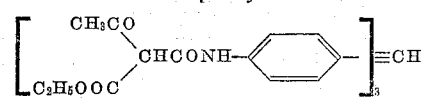

A mixture of 8.7 parts of ethyl acetoacetate, 20 parts of dry ether and 0.02 part sodium are stirred with exclusion of moisture until the sodium has dissolved. A solution of 4:4':4''-triisocyanatotriphenylmethane in 25 parts of dry ether is added below 30° C. and the mixture thereafter stirred for 15 hours at 18–20° C. The reaction product is filtered and may be further purified by repeated crystallisation from petroleum ether of boiling point 100–120° C. to give a while crystalline solid melting at 143–144° C.

In place of the pure triisocyanate, a corresponding amount of technical triisocyanatotriphenylmethane may be used. The crude reaction product melts at 110–120° C.

For bonding rubber to cellulose or regenerated cellulose we prefer to use compounds of the stated formula wherein R contains not more than 8 carbon atoms, R' is hydrogen and the hydrocarbon radicals in R'' and R''' each contain not more than 7 carbon atoms.

Rubbers or other synthetic polymeric materials which may be bonded by the process of this invention include natural and synthetic rubbers, for example polychloroprene, butadiene and substituted butadiene polymers and interpolymers and olefine polysulphide rubbers; cellulose derivatives containing hydroxyl, amino or other active-hydrogen-containing groups including esters such as acetate, propionate, butyrate, and nitrate; cellulose mixed esters; cellulose ethers, such as methyl or ethyl cellulose; carboxylated cellulose, polyvinyl alcohol and polyvinyl alcohol derivatives, e. g. acetatem, propionate, acetals and ketals; polyvinyl halides, polystyrene, polytetrafluoroethylene and polyethylene, alkyd resins which may or may not be oil-modified, condensation products of formaldehyde with materials such as phenols, amides (including ureas and sulphonamides), aldehydes, ketones, aromatic ethers, aromatic hydrocarbons, carbamates and amines; polyester amides, polyamides, ether resins, polymeric derivatives of acrylic, methacrylic or fumaric acid.

When natural or synthetic rubbers are used, they may be compounded with the ingredients such as are customarily incorporated therewith for curing, filling, pigmenting and like purposes.

Fibrous materials which may be bonded by the process of this invention include yarns, filaments, cords, fabrics and the like having a basis of regenerated cellulose, cellulose ethers, cellulose esters, cotton, linen, wool, nylon or polyesters such as polyethylene terephthalate.

In one method of carrying out the process of this invention, one or both of the materials to be bonded are coated with a compound of the stated formula; the compound is preferably applied in solution in a volatile organic liquid which is then allowed to evaporate. The coating may be effected in any conventional manner, for example by spraying, brushing, dipping or spreading. The surfaces are then placed together and held together whilst heated under pressure. Under these conditions firm bonds are obtained. When the materials to be bonded are rubbers and fibrous materials, as in the manufacture of reinforced rubber articles, the bonding is advantageously effected during the vulcanisation of the rubber.

When textile material is coated with the compound of the stated formula, after drying, the compound may appear as a loose coating on the surface of the textile and to enable the easy handling of the treated textiles it may be advantageous to heat the treated textile so that the compound is fused or baked thereon. The temperature necessary varies between wide limits depending on both the textile and the agent employed. Temperatures of 100–200° C. have been used successfully.

The amounts of the compound of the stated formula may vary widely, and the requirements for strong bonds are conveniently determined by trial. For bonding textiles to rubber satisfactorily results have been obtained when the quantity applied is from 0.1% to 25% of the weight of the textile material.

A proportion of one or more of the rubbers or other synthetic polymeric materials hereinbefore mentioned may be incorporated with the compound of the stated formula used in the bonding process.

According to a further feature of the invention we provide adhesive compositions comprising a compound of the stated formula, a volatile organic liquid and/or one or more of the rubbers or other synthetic polymeric materials of the kind hereinbefore mentioned which is compatible therewith.

Particularly suitable polymeric materials which can be incorporated in the adhesive compositions of the invention are natural or synthetic rubbers and resinous condensation products of formaldehyde with other materials. Satisfactory results have been obtained when the quantity of the polymeric material incorporated is from 10% to 90% of the total solids content of the composition. Pigments, curing agents, fillers and the like may also be included in the composition.

Suitable organic liquids are those which dissolve but do not react with the compound of the stated formula and which also, if a polymeric material is to be dissolved therein, have some solvent action on the particular polymeric material to be used. Examples of such liquids are benzene, methyl ethyl ketone, chloroform, trichloroethylene and mixtures of these. Satisfactory adhesive solutions have been obtained when the total solids content of the composition is from 0.1% to 70%.

If desired, metallic driers, such as are customarily used in the drying oil art, for example, cobalt naphthenate or manganese linoleate, may be incorporated with the compound of the stated formula or with the composition comprising it.

In another method of carrying out the process of the invention, the compound of the stated formula is incorporated into one or both of the materials to be bonded. This method is especially useful when the materials to be bonded are rubbers and fibrous materials, for example in the manufacture of reinforced rubber articles such as tyres, belts, etc., for which purpose the bonding process of the present invention is especially valuable. According to this method, the compounds of the stated formula may be mixed with, for example, the viscose dope, and the fibres obtained therefrom may be bonded directly to the rubber, with or without the use of further quantities of compounds of the stated formula or of other adhesives.

The compounds of the stated formula can be dispersed in water, especially with the assistance of dispersing agents, such as soap, sulphated fatty alcohols, ethylene oxide condensation products derived from e. g. alcohols, acids, amines, etc., quaternary ammonium compounds containing long-chain radicals, formaldehyde/aryl sulphonic acid condensates, etc., and these dispersions can also be used in the bonding processes of the present invention.

The dispersion of the compounds in water may be achieved by ball-milling or by any other means for dispersing solids in water.

The concentration of the aqueous dispersion may be varied widely according to the particular method of bonding to be used; for example suitable dispersions for addition to viscose dope prior to spinning or to coagulating baths or for treatment of the viscose filaments during subsequent stages of manufacture of cords may contain from about 5 to about 25% solids; suitable dispersions for use in impregnating cotton or viscose rayon tyre cords may contain from about 1 to about 50% solids; more or less concentrated dispersions may be used as desired. The solid content of the dispersions may comprise solely one or more compounds of the stated formula or, for example, about 3 to 20% of said compounds and if desired about 3 to 20% of the natural rubber.

When the aqueous dispersions are prepared with the assistance of dispersing agents, more concentrated stable dispersions may be obtained than in the absence thereof. The dispersing agent used may be cationic, anionic or non-ionic; when a cationic agent is used, a latex the particles of which are positively charged, is compatible with the dispersion.

Thus according to a further feature of the invention we provide aqueous dispersions of the compounds of the stated formula, alone or in admixture with dispersing agents, synthetic polymeric materials or other ingredients.

Aqueous dispersions containing as little as 0.5% of the adhesive compounds have been found to be effective in the bonding process. Aqueous dispersions containing up to 70% of the adhesive compounds are readily prepared and can be easily applied to the materials to be bonded.

Readily dispersible powders may be obtained by incorporating the dispersing agents with the adhesive compounds; the ingredients may be ground together in the presence of water and then dried. The powders so obtained, containing preferably from 10% to 60% by weight of dispersing agent, may be readily dispersed by stirring into water to give aqueous dispersions suitable for the bonding processes of this invention.

The invention is illustrated but not limited by the following examples in which parts and percentages are by weight.

EXAMPLE 10

The following rubber reinforcing black stock is made up:

| | Parts |
|---|---|
| Smoked sheet | 100 |
| Zinc oxide | 5 |
| Carbon black | 47.5 |
| Stearic acid | 3 |
| Sulphur | 3 |
| Mercaptobenzthiazole | 0.85 |

4.78 parts of the above stock are dissolved in 95.22 parts of benzene to yield a 3% rubber solution. To this are added 1.5 parts of N:N'-bis-(α-carbethoxyacetoacetyl)-1:6-hexamethylenediamine.

Rayon tyre cords of 1100/2 construction are dipped in this cement and then dried out at 100° C. The amount of dry adhesive on the cords is about 4.7%. The treated cords are then placed in contact with a sheet of the rubber reinforcing black stock detailed above, reinforced with a backing of 2 sheets of 12 oz. cotton sheet and previously friction coated with the stock. The assembly is then placed in a hydraulic press and curing and bonding are effected by heating for 45 minutes at 141° C. The bonded sample is allowed to cool by standing overnight and the pull required to separate the rayon cord from the rubber is determined by means of a Goodbrand tensile tester using a jaw separation speed of 10 cms. per minute; tests are carried out at 20° C. and 95–100° C. Bonds exceeding 30 lbs./inch width are obtained. Similar results are obtained if 1 part of a butylaldehyde/aniline condensate is substituted for the 0.85 part of mercaptobenzthiazole in the formulation of the stock above and cured at 125° C.

EXAMPLE 11

The procedure described in Example 10 is repeated using 3 parts of N:N'-bis-(carbethoxyacetoacetyl)-1:6-hexamethylenediamine. The amount of adhesive on the cords after drying is 4.8%. The bond achieved at 20° C. and 95–100° C. well exceeds 30 lbs./inch width.

EXAMPLE 12

3 parts of milled smoked sheets are dissolved in 97 parts of benzene to yield a non-viscous rubber cement. To this are added 1.5 parts of N:N'-bis-(α-carbethoxyacetyl)-1:6-hexamethylenediamine.

Rayon tyre cord of 1100/2 construction is then dipped in this mixture. After drying, the solids on the cords are 5.4%. The process described in Example 10 is carried out. Bonds of greater than 18 lbs./inch width are obtained.

EXAMPLE 13

The procedure described in Example 12 is repeated using 3.0 parts of N:N'-bis-(α-carbethoxyacetoacetyl)-1:6-hexamethylene diamine. The amount of adhesive on the cords after drying is 6.7%. Bonds at 20° C. and 95–100° C. exceed 22 lbs./inch width.

EXAMPLE 14

10 parts of N:N'-bis-(α-carbethoxyacetoacetyl)-1:6-hexamethylene diamine are dissolved in 90 parts of benzene and rayon cords are dipped in the mixture. After drying the dry adhesive on the cords is about 10%. The bonding procedure detailed in Example 10 is followed and bonds exceed 30 lbs./inch width.

EXAMPLE 15

4.78 parts of the natural rubber reinforcing black stock described in Example 10 are dissolved in 95.22 parts of benzene and 1.5 parts of N:N'-bis-(α:α-dicarboxyethoxyacetyl)-1:6-hexamethylene diamine are added to the mixture. Rayon tyre cords of 1100/2 construction are dipped in the so-obtained mixture. The mount of adhesive on the cords after drying is 5.7%. The bonding process as described in Example 1 is repeated using a cure cycle of 12½ minutes at 160° C. Bonds of over 18 lbs./inch width result.

EXAMPLE 16

Example 10 is repeated using 3 parts of N:N'-bis-(α-carbethoxyacetoacetyl)-m-toluylene diamine (prepared by condensing m-toluylene diisocyanate with acetoacetic ester in ether solution in the presence of a trace of sodio acetoacetic ester) in place of the 1.5 parts of the corresponding diamine. The percentage adhesive on the cords is about 2.9 and the bond strength exceeds 24 lbs./inch width when tested at room temperature.

EXAMPLE 17

Example 10 is repeated using 3 parts of N:N'-bis-(carbethoxyacetyl)-hexamethylene diamine, M. P. 105.6° C. (prepared from hexamethylene diamine and malonic ester chloride in benzene solution in the presence of sodium carbonate) in place of the 1.5 parts of the corresponding diamine. The percentage adhesive on the cords is about 4 and bond strengths greater than 18 lbs./inch width at room temperature are obtained.

EXAMPLE 18

Example 10 is repeated using 3 parts of N:N'-bisacetoacetyl-hexamethylene diamine, M. P. 143–4° C. (prepared by condensing diketene with hexamethylene diamine). The percentage adhesive on the cords is about 5 5 and the bond strength 15 lbs./inch width.

EXAMPLE 19

Example 10 is repeated using 6 parts of N:N'-(α:α-dicarbethoxyacetyl)-m-toluene diamine M. P. 125–6° C. (prepared by condensing m-toluylene diisocyanate with diethylmalonate in the presence of a trace of sodio diethyl malonate) in place of the 1.5 parts of the corresponding diamine. The percentage adhesive on the cords is about 3.6 and the bond strength greater than 13 lbs./inch width.

EXAMPLE 20

Example 10 is repeated using 6 parts of N:N'-bis-(α:α-di-acetoacetyl)-hexamethylene diamine, M. P. 144–5° C. (prepared by condensing hexamethylene diisocyanate with acetylacetone in the presence of a trace of sodio acetylacetone). The percentage adhesive on the cords is about 4.2 and the bond strength greater than 13 lbs./inch width.

EXAMPLE 21

Example 10 is repeated using 1.5 parts of N:N'-bis-(α:α-dicarbethoxyacetyl)-hexamethylene diamine, M. P. 124–6° C. (prepared from hexamethylene diisocyanate and diethyl malonate in the presence of a trace of sodio diethylmalonate). The percentage adhesive on the cords is about 5.7 and after curing for 15 minutes at 160° C. the bond strength is 17 lbs./inch width.

EXAMPLE 22

Example 10 is repeated using 6 parts of $N^2:N^4:N^6$-tris-(α-carbethoxyacetoacetyl)toluene triamine, M. P. 152–3° C. (prepared from toluene 2:4:6-triisocyanate and acetoacetic ester in the presence of a trace of sodioacetoacetic ester. The percentage adhesive on the cords is 6.1 and the bond strength is greater than 25 lbs./inch width.

EXAMPLE 23

Example 10 is repeated using 6 parts of N:N':N''-tris-(α-carbethoxyacetoacetyl) - p:p':p'' - triaminotriphenylmethane M. P. 152–3° C. (prepared from triphenylmethane-p:p':p''-triisocyanate and acetoacetic ester in the presence of traces of sodioacetoacetic ester). The percentage adhesive on the cords is 1.8 and the bond strength is greater than 28 lbs./inch width. Similar results are obtained using the product derived from technical grade triisocyanate.

EXAMPLE 24

Example 10 is repeated using 3 parts of N:N''-bis-(α-carbethoxybenzoylacetyl)hexamethylene diamine, M. P. 118–119° C. (prepared from hexamethylene diisocyanate and benzoylacetic ester in the presence of traces of sodio benzoylacetic ester). The percentage adhesive on the cords is 2.8 and the bond strength is 21 lbs./inch width.

EXAMPLE 25

Example 10 is repeated using 6 parts of N:N'-bis-(α-carbethoxyacetoacetyl)-4-chloro-m-phenylene diamine, M. P. 125–6° C. (prepared from 4-chloro-benzene-1:3-diisocyanate and acetoacetic ester in the presence of traces of sodioacetoacetic ester). The percentage adhesive on the cords is 10.9 and the bond strength is greater than 30 lbs./inch width.

EXAMPLE 26

Rayon tyre cords of 1100/2 construction are dipped in a 3% benzene solution of N:N'-bis-α(carbo-2-chloroethoxy acetoacetyl) - p:p' - diaminodiphenylmethane, M. P. 129–130° C. (prepared from diphenylmethane p:p'-diisocyanate and 2-chloroethylacetoacetate in the presence of traces of sodio 2-chloroethylacetoacetate) and then dried first at room temperature and finally at 100° C. The percentage adhesive on the cords is about 15. The cords are then bonded to a pad of rubber reinforcing black stock as described in Example 10. The bond strength is 19.8 lbs./inch width.

EXAMPLE 27

Example 10 is repeated using 6 parts of N:N'-bis-(α-carbethoxyacetoacetyl) p:p'-diaminodiphenyl methane M. P. 134–5° C. (prepared from diphenylmethane p:p'-diisocyanate and acetoacetic ester in the presence of traces of sodioacetoacetic ester). The percentage adhesive on the cords is about 3.5 and the bond strength is greater than 30 lbs./inch width. Similar results are obtained using the condensate of technical diphenylmethane diisocyanate with acetoacetic ester using drying temperatures of 100° C. or higher.

EXAMPLE 28

The following rubber stock is made up:

| | Parts |
|---|---|
| Smoked sheet | 100 |
| Zinc oxide | 50 |
| Stearic acid | 2 |
| Pine tar | 2.8 |
| Sulphur | 2.75 |
| β-Naphthylamine | 1.5 |
| Mercaptothiazole | 0.75 |

4.77 parts of the above stock are dissolved in 95.24 parts of benzene to yield a 3% rubber solution to which are added 1.5 parts of a condensate of technical diphenylmethane p:p'-diisocyanate with acetoacetic ester.

Rayon tyre cords of 1100/2 construction are dipped in this cement and baked for 30 minutes at 110° C. The amount of dry adhesive on the cords is 7.5%. On bonding to the stock detailed above in the manner described in Example 10 bond strengths of greater than 30 lbs./inch width are obtained.

Similar results are obtained using cotton instead of rayon, or using 1% butyraldehyde/aniline condensation product as accelerator instead of 0.75% mercaptobenzthiazole in the above stock.

EXAMPLE 29

Cotton is treated with the cement made as in Example 10 but using a condensate of technical diphenylmethane-p:p'-diisocyanate with acetoacetic ester and a baking temperature of 110° C. The percentage adhesive on the cords is 5%. The cords are then bonded to the stock described in Example 28, giving bond strengths of greater than 30 lbs./inch width.

EXAMPLE 30

Rayon tyre cords are treated with a 1% benzene solution of the condensate of technical diphenylmethane-p:p'-diisocyanate with acetoacetic ester and after drying for 30 minutes at 100° C. the cords are bonded to stock as described in Example 10. Bond strengths of greater than 30 lbs./inch width are obtained.

Similar results are obtained using 0.5% or 3.0% benzene solutions. Benzene may also be replaced by toluene or the stock by that described in Example 28.

EXAMPLE 31

3 parts of rubber are dissolved in 97 parts of benzene. To this solution are added 3 parts of the condensate of technical diphenylmethane diisocyanate with acetoacetic ester. Rayon tyre cords are treated with this cement. The amount of adhesive on the cords after baking for 30 minutes at 110° C. is 2.9%.

The treated cords are then bonded to a rubber stock as described in Example 1. Using the stock described in Example 10 or the stock described in Example 28 the bond strength is greater than 26 lbs./inch width.

EXAMPLE 32

The following GRS reinforcing black stock is made:

| | Parts |
|---|---|
| GRS | 90 |
| Whole tyre reclaim | 16.5 |
| ZnO | 5 |
| Pine tar | 5 |
| Stearic acid | 1 |
| Sulphur | 2.5 |
| Kosmos 20 | 35 |
| Dibenzthiazyldisulphide | 1.75 |
| Diphenylguanidine | 0.3 |

4.7 parts of the above stock are dissolved in 93.3 parts of benzene. To this solution are added 1.5 parts of N:N'-bis-(α-carbethoxyacetoacetyl)-1:6-hexamethylenediamine.

Rayon tyre cords when treated with this solution and bonded to the above stock as described in Example 10 give a bond strength greater than 23 lbs./inch width.

EXAMPLE 33

10 parts of N:N'-bis(α-carbethoxyacetoacetyl)-p:p'-diaminodiphenylmethane, 20 parts of water and 1 part of a water-soluble cetyl alcohol polyglycol ether are ball milled together to give a fine dispersion.

Sufficient water is added to the dispersion to reduce the solid content to 5%. Dried rayon tyre cords of 1100/2 construction are dipped in the diluted dispersion and then dried at 100° C. The amount of dry adhesive on the cords is about 5%. The treated cords are then placed in contact with a sheet of a rubber reinforcing black stock of the following composition:

| | Parts |
|---|---|
| Smoked sheet | 100 |
| Zinc oxide | 5 |
| Carbon black | 47.5 |
| Stearic acid | 3 |
| Mercaptobenzthiazole | 0.85 |
| Sulphur | 3 |

The rubber stock is reinforced with a backing of 2 sheets of 12 oz. cotton sheet previously friction coated with the stock. The assembly is placed in a hydraulic press and curing and bonding are effected by heating for 45 minutes at 1410° C. The bonded sample is allowed to cool by standing overnight and the pull to separate the rayon cords from the rubber is determined by means of a Goodbrand tensile tester using a jaw separation speed of 10 cms. per minute. Tests are carried out at 20° C. and 90–100° C. Bonds of 19 lbs. and 17.6 lbs. per inch width are obtained.

EXAMPLE 34

Example 33 is repeated using 1 part of a water-soluble salt of a fatty alcohol sulphate in place of the polyglycol ether. The percentage dry adhesive on the cords is 3%. Bonds of 11.5 lbs. and 8.5 lbs. per inch width are obtained.

EXAMPLE 35

Example 33 is repeated using 1 part of a water-soluble salt of a formaldehyde/naphthalene sulphonic acid condensate in place of the polyglycol ether.

The percentage dry adhesive on the cords is 1.7%. Bonds of 35.5 lbs. and 33 lbs. per inch width are obtained.

EXAMPLE 36

Example 33 is repeated using the dispersion diluted to 3% and then mixed with an equal proportion of 3% natural rubber latex. The percentage dry adhesive on the cords is 16.3% and bond strengths of 14 and 10 lbs. per inch width is obtained.

EXAMPLE 37

Example 36 is repeated using 1 part of a water-soluble salt of a fatty alcohol sulphate in place of the polyglycol ether. The percentage dry adhesive on the cords is 16.6 and bond strengths of 11 and 6.6 lbs. per inch width are obtained.

EXAMPLE 38

Example 36 is repeated using a water-soluble salt of a formaldehyde/naphthalene sulphonic acid condensate in place of the polyglycol ether. The percentage dry adhesive on the cords is 14.8 and bond strengths of 24 and 15.5 lbs. per inch width are obtained.

EXAMPLE 39

Example 38 is repeated using the 3% aqueous dispersion mixed with 5 times its volume of 3% natural rubber latex. The percentage dry adhesive on the cords is 2.8% and the bond strengths are 27.5 and 20 lbs. per inch width.

EXAMPLE 40

5 parts of N:N'-bis-($\alpha$-carbethoxyacetoacetyl)-p:p'-diaminodiphenylmethane are ball milled for 24 hours with 45 parts of water; an aqueous dispersion of fine particle size and of moderate stability is obtained.

Rayon tyre cords of 1100/2 construction are dipped in this dispersion, dried out at room temperature and finally for 30 minutes at/100° C. The cords are then bonded to the natural rubber reinforcing black stock described in Example 33 and tested as described in Example 33. With 6% dry adhesive on the cords, the load to peel at room temperature is 27.5 lbs. per inch width.

EXAMPLE 41

Example 33 is repeated using 10 parts of a condensate of technical diphenylmethane diisocyanate with acetoacetic ester dispersed with 1.5 parts of a water-soluble salt of a formaldehyde/naphthalene sulphonic acid condensate and baking the cords for 30 minutes at 170° C. prior to bonding. Bond strengths greater than 30 lbs./inch width are obtained. Similar results are obtained using the stock described in Example 28.

EXAMPLE 42

25 parts of N:N'-bis-($\alpha$-carbethoxyacetoacetyl)-p:p'-diaminodiphenylmethane and 25 parts of a water-soluble salt of a formaldehyde/napthalene sulphonic acid are milled together with sufficient water added to give a dough. The residual dough after drying and grinding gives a fine powder.

3 parts of the powder are dispersed by stirring into 97 parts of water. Rayon tyre cords are then treated with this dispersion and after drying for 30 minutes at 100° C. are bonded to a stock as described in Example 33. The bond strength is 27.5 lbs./inch width.

EXAMPLE 43

The following neoprene GN reinforcing black stock is compounded:

| | Parts |
|---|---|
| Neoprene GN | 100 |
| Light calcined magnesia | 4 |
| Stearic acid | 2.5 |
| Tricresyl phosphate | 2.5 |
| Carbon black | 36 |
| Zinc oxide | 5 |

4.5 parts of the above stock are dissolved in 95.5 parts of benzene. To this solution 3 parts of a condensate of technical diphenylmethane p:p'-diisocyanate and acetoacetic ester are added. Rayon tyre cords are treated with this solution and baked at 120° C. for 30 minutes. Bond strengths exceeding 35 lbs./inch width are obtained.

Cotton tyre cords similarly treated and bonded to the same stocks give bond strengths of 24 lbs./inch width.

EXAMPLE 44

Rayon tyre cords are treated with the dispersion described in Example 41 and baked at 150° C. for 30 minutes to give less than 1% dry adhesive on the cords. By bonding to the stock described in Example 43 using similar conditions of cure, bonds of 30 lbs./inch width are obtained.

Similarly cotton tyre cords bonded under similar conditions and with 2% dry adhesive on the cords yield bonds of 24 lbs./inch width.

EXAMPLE 45

The following Hycar OR 15 stock is prepared:—

| | Parts |
|---|---|
| Hycar OR 15 | 100 |
| Pine tar | 3 |
| Carbon black | 50 |
| Stearic acid | 2 |
| Zinc oxide | 10 |
| Sulphur | 2.5 |
| Mercaptobenzthiazole | 1.0 |

5 parts of the above stock are dissolved in 95 parts of a mixed solvent of composition 2 volumes of ethylene dichloride to 1 volume of ethyl acetate. To this solution 3 parts of a condensate of technical diphenylmethane p:p'-diisocyanate and acetoacetic ester are added.

Rayon tyre cords are treated with this solution and baked at 140° C. for 30 minutes to yield a dry solids deposit on the cords of 3%.

On bonding to the above stock using a cure of 60 minutes at 141° C. bonds exceeding the strength of the rubber are obtained (i. e. greater than 44 lbs./inch width).

Cotton tyre cords bonded to the same stock using a similar technique to give 3% dry solids on the cords give bonds exceeding 28 lbs./inch width.

EXAMPLE 46

Rayon tyre cords treated with the dispersion described in Example 41 and baked for 30 minutes at 140° C. and bonded to the stock described in Example 45 yield bonds exceeding 26 lbs./inch width.

EXAMPLE 47

1 part of N:N'-bis($\alpha$-carbethoxyacetoacetyl)-4:4'-diaminodicyclohexylmethane (prepared from dicyclohexylmethane 4:4'-diisocyanate and acetoacetic ester) is dissolved in 99 parts of benzene. Rayon tyre cords are dipped in this solution and baked for 30 minutes at 200° C. to give approximately 1% dry adhesive on the cords. When bonded to the natural rubber reinforcing black stock described in Example 10 bonds of up to 53 lbs./inch width at 25° C. are obtained.

EXAMPLE 48

The procedure described in Example 47 is followed using N:N' - bis - (α-carballylacetoacetyl) - p:p' - diaminodiphenylmethane, M. P. 123–4° C. (prepared from diphenylmethane p:p'-diisocyanate and allylacetoacetate) but using a baking temperature of 150° C. bonds exceeding 38/lbs./inch width at 25° C. are obtained.

EXAMPLE 49

Using N:N'-bis-(α-carbobenzyloxyacetoacetyl)-p:p'-diaminodiphenylmethane, M. P. 137–9° C. (prepared from diphenylmethane p:p'-diisocyanate and benzylacetoacetate) in Example 39 bonds of 26 lbs./inch width are obtained.

EXAMPLE 50

10 parts of a condensate of technical diphenylmethane p:p'-diisocyanate condensed with acetoacetic ester (M. P. 104–115° C.) are dispersed in 10 parts of water by ball milling with 0.75 part of a water-soluble salt of a formaldehyde/naphthalene sulphonic acid condensate. Sufficient water is then added to reduce the solid content to 1%. Rayon tyre cords are dipped in this dispersion and dried first for 20 minutes at 90° C. and then baked for 10 minutes at 110° C. The percentage dry solids on the cords is 3%. These are then bonded to a stock as described in Example 28. Bond strengths exceeding 24 lbs./inch width are obtained.

Similarly using cotton in place of rayon the percentage solids on the dry cords is about 2.4 and the bond strength is 33–40 lbs./inch width.

EXAMPLE 51

A mixture containing resorcinol, formaldehyde and latex is prepared to the following formula:

SOLUTION A

|  | Parts |
|---|---|
| Resorcinol | 3.4 |
| 40% Formalin | 7.2 |
| 10% NaOH | 3.0 |
| Water | 86.4 |

SOLUTION B

|  | Parts |
|---|---|
| 60% Latex | 50 |
| 10% NaOH | 3 |
| Water | 47 |

These are mixed by adding resorcinol/formaldehyde solution to the latex solution with stirring. To 100 parts of this mixture 200 parts of water are added. To 100 parts of this diluted mixture are added 2 parts of the 50% aqueous dispersion of a condensate of technical diphenylmethane p:p'-diisocyanate with acetoacetic ester used in Example 50. Rayon tyre cords are dipped in this mixture and baked for 30 minutes at 120° C. to give 5% dry adhesive on the cords. On bonding to the natural rubber stock detailed in Example 28 bonds of 41 lbs./inch width are obtained at room temperature and at 100° C. the bond strength is greater than the strength of the rubber.

EXAMPLE 52

Example 42 is repeated with the addition to the diluted resorcinol-formaldehyde-latex mixture of 1% of the wetting composition described in Example 1 of British Patent No. 613,931, namely a mixture of 12 parts of dodecyl sodium sulphate, 18 parts of 2-ethylhexanol, 24 parts of isopropyl alcohol and 30 parts of water. The bonds obtained are similar to those of Example 51.

EXAMPLE 53

A latex composition is made up containing 4% of casein and 12½% of rubber. 10% of sodium carbonate on the weight of the casein is added to solubilise the casein. To 100 parts of latex composition 6 parts of a 50% aqueous dispersion of a condensate of technical diphenylmethane p:p'-diisocyanate with acetoacetic ester used in Example 41 is added. This mixture is diluted with an equal volume of water and rayon tyre cords are dipped in the diluted dispersion. The treated cords are heated for 30 minutes at 125° C. to give 3.5% adhesive on the cords, and bonded to a stock as detailed in Example 28. Bonds exceeding 34 lbs./inch width are obtained.

What we claim is:

1. A process for bonding a rubber compound selected from the group consisting of natural rubber, polymers of butadiene and, polymers of chlorobutadiene, to cellulosic fibrous materials which comprises bringing the said rubber compound and the said fibrous material together in the presence of an adhesive compound obtained by reacting a polyisocyanate selected from the group consisting of ethylenediisocyanates, butylene diisocyanate, hexamethylene diisocyanates, benzene di- and tri-isocyanates, toluene di- and tri-isocyanates, diphenyl-methane p:p'- diisocyanates, dicyclohexylmethane dissocyanates, chlorobenzene di- and tri-isocyanates, naphthalene di- and tri-isocyanates, stilbene diisocyanate, ditolylmethane p:p'-diisocyanates, dixylylmethane diisocyanates, diphenylpropane p:p'-diisocyanates, diphenylmethane tetraisocyanate, trimethylbenzene triisocyanates, phenyltolylmethane triisocyanates, ditolylmethane triisocyanates, and triphenylmethane triisocyanates with ethyl acetoacetate, said adhesive compound having the formula

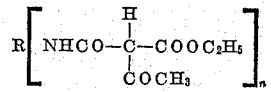

wherein R is a radical selected from the group consisting of hydrocarbon and halohydrocarbon radicals corresponding to the polyisocyanate used and $n$ is an integer from 2 to 3.

2. A process as set forth in claim 1 wherein the bonding is performed in conjunction with a vulcanisation of the rubber.

3. A process as set forth in claim 1 wherein the compound of the stated formula is incorporated into at least one of the materials to be bonded.

4. An adhesive composition comprising a compound obtained by reacting a polyisocyanate selected from the group consisting of ethylene diisocyanates, butylene diisocyanate, hexamethylene diisocyanates, benzene di- and tri-isocyanates, toluene di- and tri-isocyanates, diphenylmethane p:p'-diisocyanates, dicyclohexylmethane diisocyanates, chlorobenzene di- and tri-isocyanates, naphthalene di- and tri-isocyanates, stilbene diisocyanate, ditolylmethane p:p'-diisocyanates, dixylylmethane diisocyanates, diphenylpropane p:p'-diisocyanates, diphenylmethane tetraisocyanate, trimethylbenzene triisocyanates, phenyltolylmethane triisocyanates, ditolylmethane triisocyanates, and triphenylmethane triisocyanates with ethyl acetoacetate, said compound having the formula

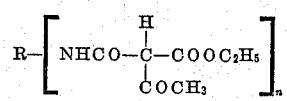

wherein R is a radical selected from the group consisting of hydrocarbon and halohydrocarbon radicals corresponding to the polyisocyanate used and $n$ is an integer from 2 to 3, and a rubber compound selected from the group consisting of natural rubber, polymers of butadiene, and polymers of chlorobutadiene.

5. A process for bonding a rubber compound selected from the group consisting of natural rubber, polymers of butadiene, and polymers of chlorobutadiene, to cellulosic fibrous materials which comprises bringing the said rubber compound and the said fibrous material together in the presence of an adhesive composition containing an aqueous dispersion of a compound obtained by reacting a polyisocyanate selected from the group consisting of ethylene diisocyanates, butylene diisocyanate, hexamethylene diisocyanates, benzene di- and tri-isocyanates, toluene di- and tri-isocyanates, diphenylmethane p:p'-diisocyanates, dicyclohexylmethane diisocyanates, chlorobenzene di- and tri-isocyanates, naphthalene di- and tri-isocyanates, stilbene diisocyanate, ditolylmethane p:p'-diisocyanates, dixylylmethane diisocyanates, diphenylpropane p:p'-diisocyanates, diphenylmethane tetraisocyanate, trimethylbenzene triisocyanates, phenyltolylmethane triisocyanates, ditolylmethane triisocyanates, and triphenylmethane triisocyanates with ethyl acetoacetate, said compound having the formula

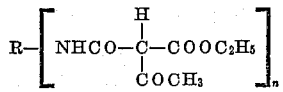

wherein R is a radical selected from the group consisting of hydrocarbon and halohydrocarbon radicals corresponding to the polyisocyanate used and $n$ is an integer from 2 to 3.

6. A process for bonding a rubber compound selected from the group consisting of natural rubber, polymers of butadiene, and polymers of chlorobutadiene, to cellulosic fibrous materials which comprises bringing the said rubber compound and the said fibrous material together in the presence of an adhesive composition comprising from 40% to 90% of a compound obtained by reacting a polyisocyanate selected from the group consisting of ethylene diisocyanates, butylene diisocyanate, hexamethylene diisocyanates, benzene di- and tri-isocyanates, toluene di- and tri-isocyanates, diphenylmethane p:p'-diisocyanates, dicyclohexylmethane diisocyanates, chlorobenzene di- and tri-isocyanates, naphthalene di- and tri-isocyanates, stilbenzene diisocyanate, ditolylmethane p:p'-diisocyanates, dixylylmethane diisocyanates, diphenylpropane p:p'-diisocyanates, diphenylmethane tetraisocyanate, trimethylbenzene triisocyanates, phenyltolylmethane triisocyanates, ditolylmethane triisocyanates, and triphenylmethane triisocyanates with ethyl acetoacetate, said compound having the formula

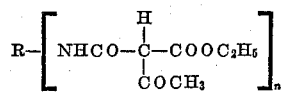

wherein R is a radical selected from the group consisting of hydrocarbon and halohydrocarbon radicals corresponding to the polyisocyanate used and $n$ is an integer from 2 to 3, and from 10% to 60% of a dispersing agent.

7. A process as claimed in claim 1 wherein said rubber is a copolymer of butadiene with acrylonitrile.

8. A process as claimed in claim 1 wherein said rubber is a copolymer of butadiene with styrene.

References Cited in the file of this patent
UNITED STATES PATENTS

| | | |
|---|---|---|
| 1,594,864 | Zitscher et al. | Aug. 3, 1926 |
| 2,009,396 | Goldstein | July 30, 1935 |
| 2,415,839 | Neal et al. | Feb. 18, 1947 |
| 2,417,792 | Verbanc | Mar. 18, 1947 |
| 2,430,479 | Pratt et al. | Nov. 11, 1947 |
| 2,436,222 | Neal et al. | Feb. 17, 1948 |
| 2,650,212 | Windemuth | Aug. 25, 1953 |

FOREIGN PATENTS

| | | |
|---|---|---|
| 571,338 | Great Britain | Aug. 21, 1945 |

OTHER REFERENCES

Modern Plastics, June 1947, pp. 149–152 and 250, 252, 254, 256 and 258.